J. P. BUCKLEY.
COUPLING ATTACHING AND TESTING MACHINE.
APPLICATION FILED OCT. 23, 1909.
1,022,720.
Patented Apr. 9, 1912.
4 SHEETS—SHEET 1.
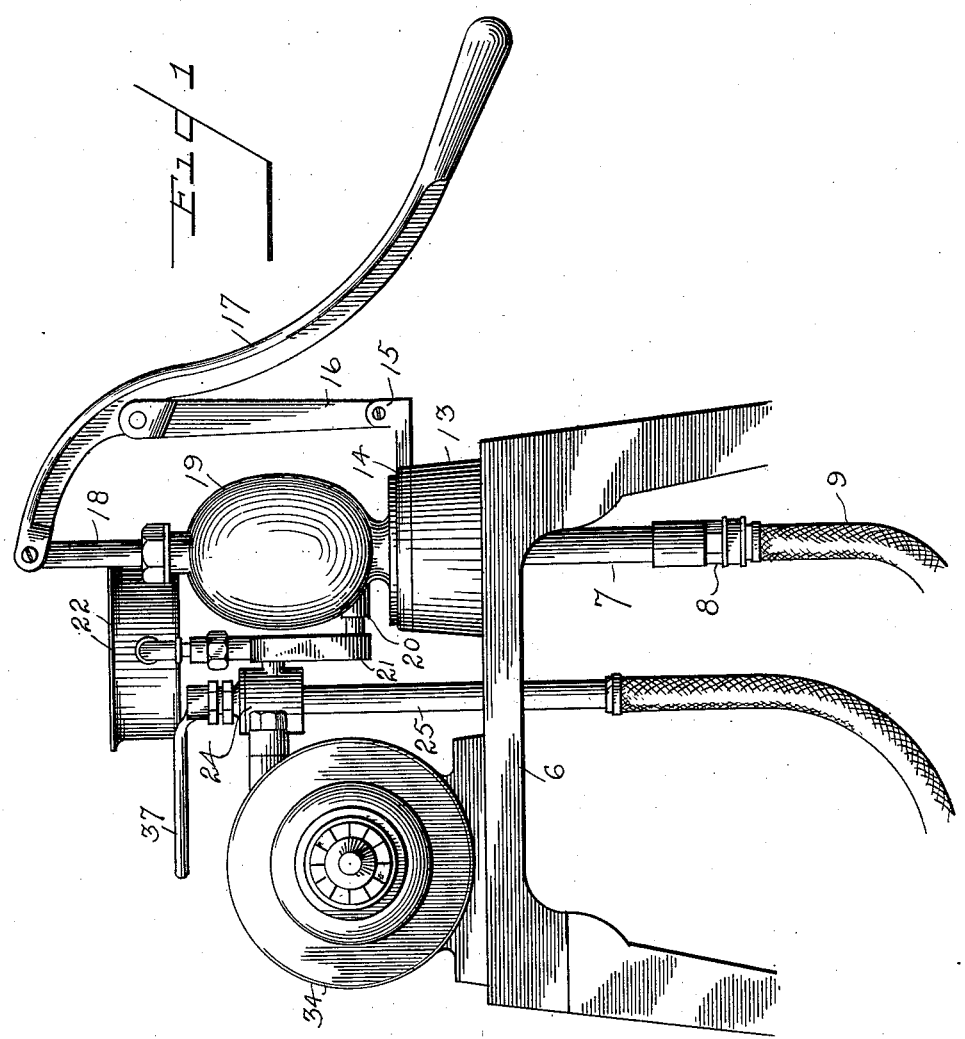
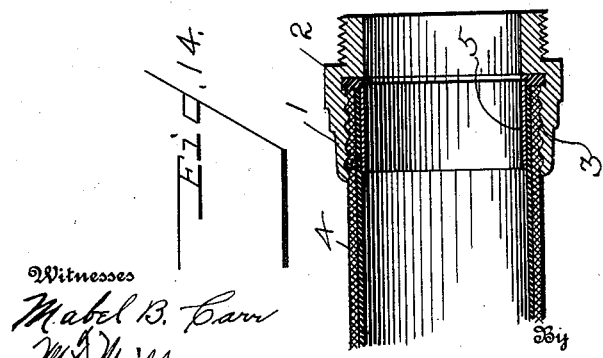

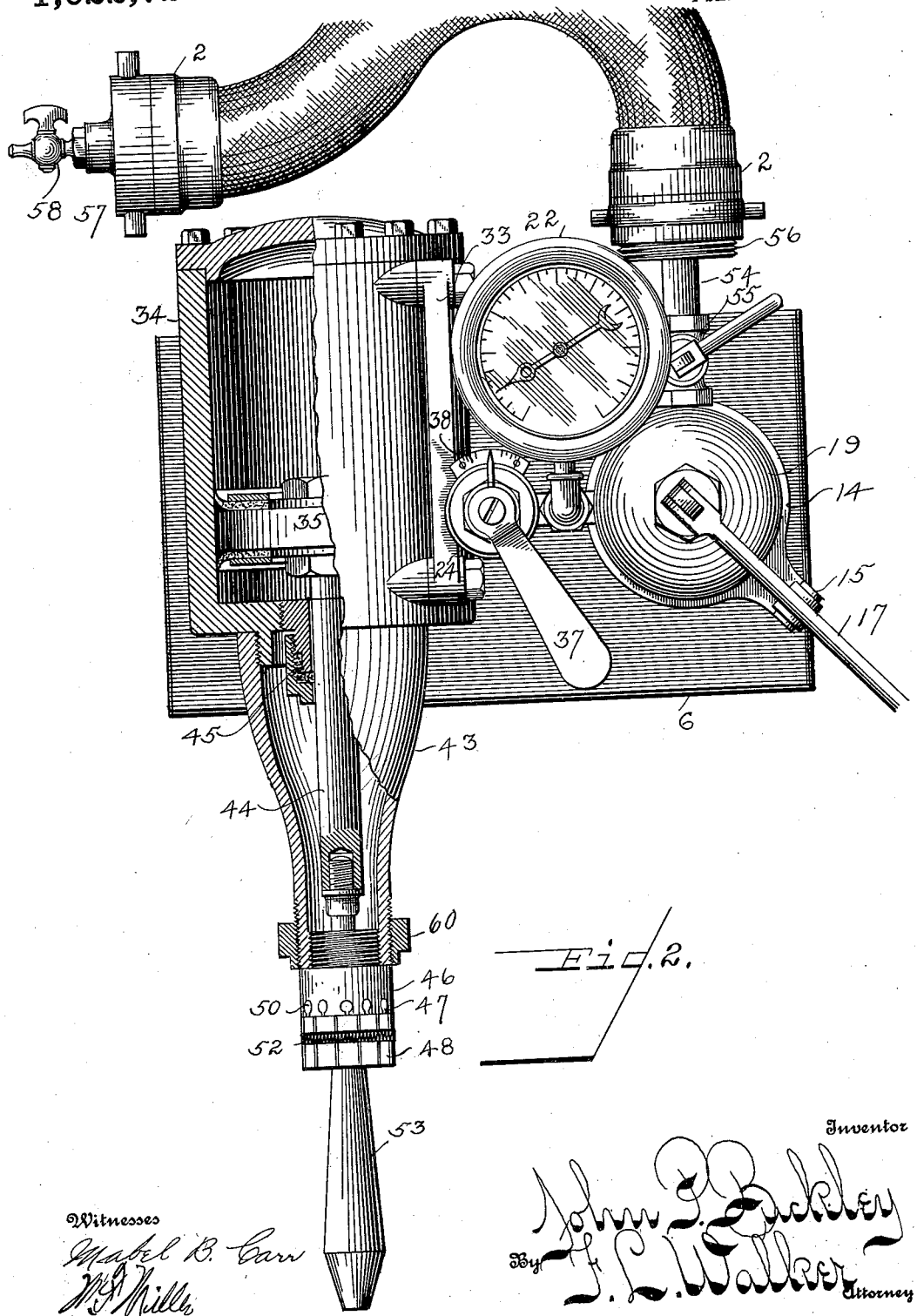

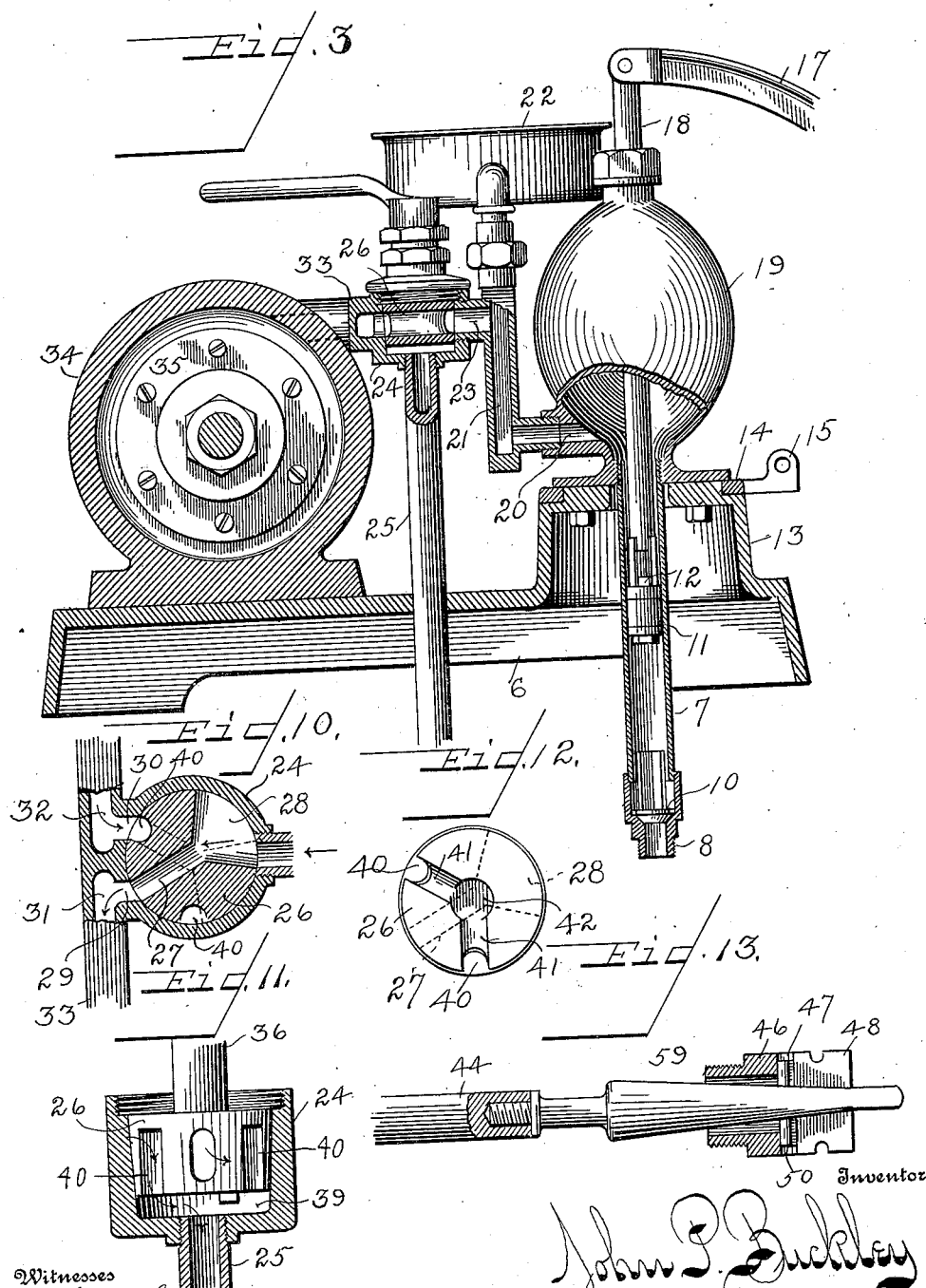

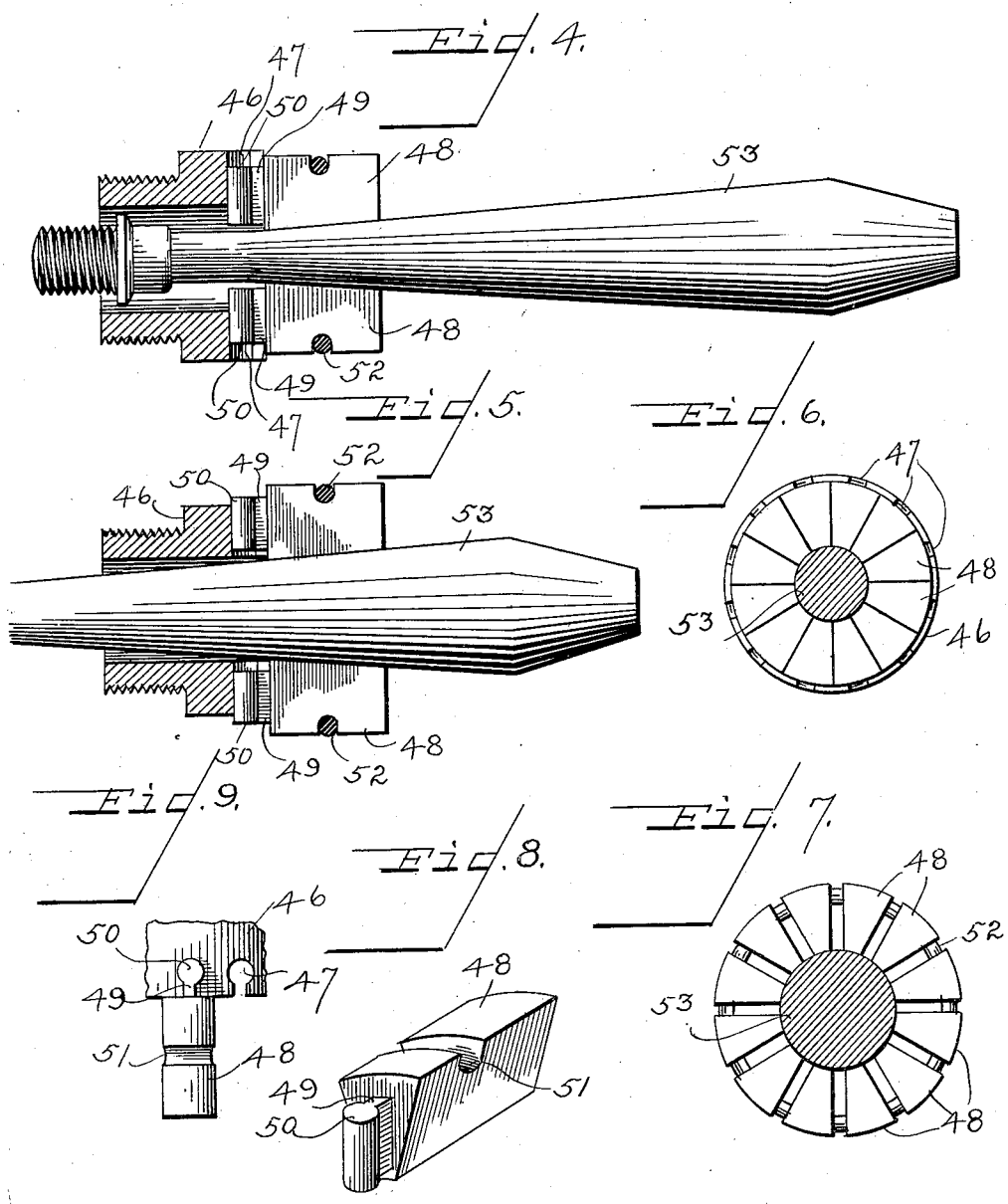

UNITED STATES PATENT OFFICE.

JOHN P. BUCKLEY, OF DAYTON, OHIO, ASSIGNOR TO MAURICE D. LARKIN, DOING BUSINESS AS LARKIN MANUFACTURING COMPANY, OF DAYTON, OHIO.

COUPLING ATTACHING AND TESTING MACHINE.

1,022,720.  Specification of Letters Patent.  Patented Apr. 9, 1912.

Application filed October 23, 1909. Serial No. 524,166.

*To all whom it may concern:*

Be it known that I, JOHN P. BUCKLEY, a citizen of the United States, residing at Dayton, in the county of Montgomery and State of Ohio, have invented certain new and useful Improvements in Coupling Attaching and Testing Machines, of which the following is a specification.

My invention relates to pressure applying machines adapted to subject annular bodies to excessive internal pressure whereby said annular bodies will be expanded equally in all directions and relates more particularly to machines for securing hose to the coupling members thereof and for testing hose, particularly hose of comparatively large diameter such as fire hose and for other similar purposes.

The object of the invention is to simplify the structure as well as the means and mode of operation of such devices whereby they will not only be cheapened in construction but will be more efficient in operation, easily operated, and unlikely to get out of repair.

A further object is to provide an expanding member which will operate with equal movement and equal pressure throughout its entire periphery.

A further object is to provide means for giving to such expanded member increased power and to further provide means for accurately gaging the working pressure of the expanding member.

A further object is to provide improved controlling mechanism whereby the expanding member may be readily controlled through minute degrees of adjustment at the will of the operator.

With the above primary and other incidental objects in view as will more fully appear in the specification, the invention consists of the features of construction, the parts and combinations thereof and the mode of operation or their equivalents as hereinafter described and set forth in the claims.

Referring to the drawings, Figure 1 is a side elevation of the assembled machine. Fig. 2 is a plan view partly in section of the assembled machine. Fig. 3 is a transverse sectional view of the assembled machine. Fig. 4 is a sectional view of the expanding member in its inoperative or contracted position. Fig. 5 is a similar view showing the expanding member in its operative position. Figs. 6 and 7 are end views of the expanding member in contracted and operative positions respectively, said figures corresponding respectively with Figs. 4 and 5. Fig. 8 is a detail perspective view of one of the sectors of the expanding member. Fig. 9 is a detail view showing the inter-engagement of the sector with the retaining collar. Fig. 10 is a transverse sectional plan view of the controlling valve. Fig. 11 is a vertical sectional plan view of the controlling valve. Fig. 12 is a bottom plan view of a modification thereof. Fig. 13 illustrates a modification of the means of operating the expanding member. Fig. 14 is a sectional view of a portion of the hose with the coupling attached showing the work performed by the machine forming the subject matter of the present invention.

Like parts are indicated by similar characters of reference throughout the several views.

In providing means for attaching the metallic coupling members to sections of hose it is usual to provide the annular flange 1 of the coupling member 2 with a corrugated or irregular interior as shown at 3. The extremity of the hose section 4 projects within the flange 1 and is engaged therewith by an annular metallic ring 5 which is inserted within the interior of the hose 4 and in registry with the corrugations of the flange 1 and is then expanded by suitable expansion devices to tightly impinge the extremity of the hose section 4 between the outer periphery of the annular ring 5 and the interior corrugations of the coupling member 2 whereby the hose wall will be forced into the corrugations 3 of the coupling member thereby holding the parts securely together. Heretofore, various means have been employed for expanding the annular ring 5. On account of the nature of the parts and the working strain to which the coupling is subjected the expanding devices are necessarily very powerful. Heretofore, it has been very difficult to gage the pressure with which the couplings are applied whereby all the couplings will receive substantially the same compression. The interior diameter of the couplings and the rings varies slightly through inaccuracies of manufacture and the same is true of the walls of the hose.

With the expanding devices heretofore in use it has been very difficult to gage the pressure applied exactly, the result being that in some cases the expansion was so great as to strain or destroy the body of the coupling 2. In other cases and perhaps at the opposite end of the same section of hose the expansion was not sufficiently great to properly secure the hose and the coupling. These results were frequently found where the attempt to gage the pressure had been made by limiting the movement of the operating parts to paths of prescribed limit. To overcome such difficulties and to gage the application of the couplings by the pressure with which the couplings are applied and not by the movement of the operating parts within certain limits is one of the primary objects of the present invention. To accomplish this result there is employed a main base or table 6 preferably supported upon legs but which may be otherwise supported upon a bench or other suitable foundation. Mounted upon the base 6 is a pump comprising a stock 7 extending downward through the base 6 and terminating in the coupling 8 to which may be attached a supply hose 9 leading from a suitable source of water supply preferably a supply under pressure such as a city water supply. Adjacent to the coupling 8 the pump stock 7 is provided with a check valve 10. A pump piston 11 reciprocates within the stock 7 and is provided with the usual piston valve 12. Located about the base 13 of the pump is a revoluble annular collar 14 having a lateral arm provided with lugs 15 to which is pivoted an upward projecting link 16 pivoted at its upper extremity to the pump handle 17 which handle is connected to the piston rod 18 of the pump piston 11. By this construction the handle 17 is revolubly adjustable in relation to the pump whereby the handle may be shifted throughout an arc to sundry positions most suitable to the operator. At its upper extremity the stock 7 terminates in a reservoir or dome 19 through which the piston rod 18 extends. The dome 19 comprises both a reservoir for water and an air chamber in which the air is placed under pressure by the incoming water thereby insuring an even flow of water from the dome to the operated parts. Leading from the lower part of the reservoir or dome 19 is an outlet port 20 communicating with the vertical conduit member 21. The conduit member 21 at its upper extremity is connected with a pressure gage 22 by which the pressure of the water supply passing through the conduit member 21 is registered. An outlet port 23 from the conduit member 21 communicates with the controlling valve by which the water supply to the operating parts is regulated. The controlling valve comprises a cup-shaped casing 24 to the bottom of which is secured an off-take pipe 25. Revolubly mounted within the cup-shaped casing 24 is the valve member 26 having located therein a horizontal port or conduit 27 having a flaring mouth 28 which flaring mouth registers with the port 23 leading from the conduit member 21. The extent of the flaring mouth is such that the said mouth will be in registry with the port throughout the entire degree of movement of the valve member 26. At its opposite extremity the horizontal port 27 registers with one of the two ports 29—30, according to the revoluble adjustment of the valve member. The ports 29 and 30 communicate with oppositely extending conduits 31 and 32 located in a horizontal recessed bar 33. Secured upon the base 6 is a cylinder 34 having therein a reciprocating piston 35. The conduits 31 and 32 communicate with the interior of the cylinder 34 on opposite sides of the piston 35. The valve member 26 is provided with an upward projecting stem 36 to which is secured an operating lever 37. Formed upon the cup-shaped casing 24 is a lateral ledge 38 over which plays an indicator or pointer secured to and movable with the valve member 26 and adapted to indicate by its position the relative positions of the horizontal port 27 in relation to the ports 29 and 30. By the rotation of the valve member 26 the port 27 may be shifted from registry with the port 29 into registry with the port 30 or vice versa thereby directing the water supply to either side of the piston 35 within the cylinder 34. The valve may also be so adjusted that the port 27 will stand intermediate the two ports 29 and 30 in which case the water supply is cut off.

By reference to Fig. 11 it will be seen that the valve member 26 does not extend entirely to the bottom of the cup-shaped casing 24 but a recess or chamber 39 is provided below the valve member 26. Located in the valve member 26 upon each side of the port 27 are vertical grooves 40. The grooves 40 are so located in the valve member 26 that when the port 27 is in registry with either of the ports 29 or 30 one of the grooves 40 will at the same time be in registry with the other port 29 or 30, as the case may be, thereby providing for the discharge of water from the cylinder 34 through the corresponding conduit 31 or 32 and groove 40 into the chamber 39 from which it is conducted by the off-take pipe 25.

In Fig. 12 is shown a modification of the controlling valve in which the valve member 26 is adapted to extend entirely to the bottom of the cup-shaped casing 24 and on its lower face is provided with converging grooves 41 connecting the vertical grooves 40 with a central recess 42 registering with the mouth of the off-take pipe 25. The cylinder 34 is provided with a sleeve 43.

The piston rod 44 of the piston 35 extends through a suitable stuffing-box 45 and reciprocates within the sleeve 43. The expanding mechanism is carried upon the extremity of the sleeve 43 and is operated by the reciprocatory movement of the piston stem 44. The expanding mechanism comprises a retaining or spacing collar 46 screw threaded into the extremity of the sleeve 43 and provided with a plurality of radially disposed recessed slots 47 equally spaced in the face of said collar with which the movable sectors 48 engage. The sectors may be of any desired number, preferably approximately twelve. However, more or less sectors may be used according to the character and size of the work to be performed. The sectors comprise equal divisions of the annular body as shown particularly in Figs. 6 and 7. At their inner extremity the sectors 48 are provided with longitudinal projecting lugs 49 having a flange or beaded head 50 adapted to engage the radial recessed slots 47 of the retaining and spacing collar 46. The construction is such that the sectors 48 may be moved to and from the axis of the collar 46 while being held in their relatively spaced positions by the engagement of the lugs 49 with the radial slots 47. The sectors 48 are further provided with registering peripheral grooves 51 which combine to form a continuous groove about the collection of sectors in which is located an endless elastic band 52. The elastic band 52 may be either a continuous helical spring or it may be of rubber or other elastic composition. Extending centrally through the retaining and spacing collar 46 and engaging the inner or concentric face of the sectors 48 is a reciprocating tapered mandrel 53 attached to the extremity of the piston rod 44 and movable therewith. The construction is such that upon the retraction of the tapered mandrel 53 the sectors 48 by the engagement of their inner faces with the said mandrel will be forced outward against the tension of the elastic band 52 as shown particularly in Fig. 7. As the mandrel 53 is moved in the opposite direction or outward under the action of the piston 35 the elastic band 52 will cause the sectors to retract, returning to normal position as shown in Fig. 6. During their movement the sectors are maintained in their proper spaced relation equally disposed about the periphery of the expanding member by the engagement of the lugs 49 with the radial slots 47. A gage collar 60 is adjustably mounted upon the extremity of the sleeve 43 and adapted to locate the coupling member 2 in relation to the expanding sectors.

In operation the coupling member 2 is located about the retaining and spacing collar 46 in engagement with the gage collar 60 with the extremity of the hose section in place within the hose coupling 2 and the annular ring 5 located about the periphery of the expanding sectors 48 and within the hose. The controlling valve 26 is then rotated to bring the port 27 into registry with the port 29 which communicates by means of the conduit 31 with the sector 34 at the forward side of the piston 35. The pump being connected by means of the supply hose 9 with the city water supply which supply is usually under pressure of fifty pounds. The water will flow through the supply hose 9 past the check valve 10 and thence by the conduit member 21 and through the supply valve to the forward side of the cylinder tending to retract the piston and the tapered mandrel 53 connected therewith thereby setting the parts of the coupling and placing them under a limited pressure, the result of the ordinary water pressure whatever this may be. The pump is then operated by means of the handle 17 to increase the water pressure and by pumping the pressure within the cylinder 34 is increased, forcing the piston 35 gradually back and thereby retracting the tapered mandrel 53 which causes the expansion sectors 48 to expand within the annular ring 5 stretching said ring and placing the extremity of the hose between the annular ring and interior of the coupling under compression. The pressure of the water by which the mandrel is retracted and the sectors expanded will be indicated at each stage by the pressure gage 22.

By manipulating the controlling lever 37 of the valve 26 the operation of the parts is at all times under the control of the operator and the force with which the coupling is applied can be definitely determined and by means of the pump the pressure can be increased up to the desired point which will vary according to the character of the work for which the hose is indicated and according to the quality and construction of the couplings.

Leading from the base of the reservoir 19 at right angles to the port 20 is a conduit 54 having therein a valve 55 and at its extremity a screw threaded head 56 with which the coupling of a section of hose may be engaged. There is provided for the opposite extremity of the hose section a head 57 having therein a vent cock 58. After the hose couplings have been applied it is very desirable and usually necessary that the hose should be tested to insure the proper connection of the hose and couplings. In order to test the hose one of the couplings is attached to the head 56 of the conduit 54. The head 57 is secured to the coupling at the opposite extremity of the hose section and the vent cock is open to permit the escape of air. The valve 55 is then opened admitting water to the hose section and when the air has been exhausted from the hose section and water appears at the vent cock 58 the vent cock is closed and the water pressure within the hose section is increased by means of the pump before described until the required test pressure is indicated upon the indicator 22. It is to be understood that during this testing operation the valve 26 is adjusted with its port 27 intermediate the ports 29 and 30 thereby cutting off the water supply to the cylinder 34.

In Fig. 13 is shown a modification of the expanding mechanism in which the mandrel 59 corresponding to the mandrel 53 before described is shown with its taper arranged in the opposite direction whereby the sectors 48 will be distended by the forward movement of the piston 35 instead of by the retraction of the piston as before described.

It is to be understood that the expanding mechanism including the sectors and tapered mandrel may be provided in different sizes and interchanged whereby all the sizes may be employed in connection with the same operating mechanism.

While the actuating fluid has been referred to as water, throughout the preceding specification, it is to be understood that other fluids may be employed in place thereof, such as compressed air, steam, oil, or other fluids.

It is to be understood that while the invention is herein described and shown as applied to a hose attaching machine, for which purpose it is especially adapted, it is not limited to such use, but may be employed as a tube expander, or for the purpose of forming articles in hollow dies, or other similar purposes.

From the above description it will be apparent that there is thus produced a machine of the character described, possessing the particular features of advantage before enumerated as desirable, but which obviously is susceptible of modification in its form, proportion, detail construction, or arrangement of parts without departing from the principle involved or sacrificing any of its advantages.

Having thus described my invention I claim:

1. In a machine of the character described, the combination with radially movable expansion devices, of means for operating said expansion devices comprising a cylinder, a reciprocating piston therein adapted by its reciprocatory movement to operate the expansion devices in a radial direction, fluid supply conduits communicating with the cylinder on opposite sides of the piston adapted to admit fluid thereto under pressure, to expand the expansion devices into engagement with the work, a pump for raising the normal pressure of the fluid to further expand the said devices a predetermined amount, and a pressure indicator.

2. In a machine of the character described, the combination with an annular body having a variable circumference, of means for varying said body comprising a cylinder, a reciprocating piston therein adapted by its movement to cause the expansion of the annular body, fluid supply conduits leading to the cylinder supplying actuating fluid under pressure, to expand the annular body into engagement with the work, a controlling valve regulating the flow of actuating fluid and directing the same alternately to opposite sides of the piston, and means controlled by the operator to increase the fluid pressure to further expand the annular body a predetermined amount.

3. In a machine of the character described, the combination with radially adjustable expansion devices, of means for operating said expansion devices comprising a cylinder, a reciprocating piston therein adapted by its movement to adjust the expansion devices to and from a common point, fluid supply conduits leading to the cylinder supplying actuating fluid under pressure, a pump adapted to gradually raise the pressure of the actuating fluid above its normal pressure, a pressure gage indicating the pressure of the actuating fluid, and a control valve adapted to divert the fluid to either side of the piston.

4. The combination with expansion devices of operating means for operating said expansion devices comprising a cylinder, a reciprocating piston therein adapted by its movement to actuate the expansion devices, fluid supply conduits leading to the cylinder and adapted to supply actuating fluid to actuate the piston, thereby expanding the expansion devices into engagement with the work, and means controlled by the operator to further expand the expansion devices a predetermined amount, a valve adapted by its operation to relieve the pressure upon the piston when the predetermined expansive movement of the expansion devices is accomplished, and a gage indicating the actuating pressure at different stages of operation, substantially as specified.

5. In a machine of the character described, an expanding body adapted to engage the work, fluid pressure means for initially expanding the said body into engagement with the work, and supplemental means under the control of the operator for increasing the fluid pressure to subsequently further expand the annular body a predetermined amount, substantially as specified.

6. In a machine of the character described, an expanding body adapted to engage the work, fluid pressure means adapted at normal pressure to expand the said body into engagement with the work, and means under the control of the operator to increase the fluid pressure above normal to further expand the said body a predetermined amount, substantially as specified.

In testimony whereof, I have hereunto set my hand this 12th day of October A. D. 1909.

JOHN P. BUCKLEY.

Witnesses:
THEODORE C. LINDSEY, Jr.,
F. L. WALKER.

Copies of this patent may be obtained for five cents each, by addressing the "Commissioner of Patents, Washington, D. C."